United States Patent [19]

Hirose et al.

[11] Patent Number: 4,694,052
[45] Date of Patent: Sep. 15, 1987

[54] RADIATION-CURABLE COATING COMPOSITION

[75] Inventors: Sumio Hirose, Yokohama; Isao Naruse, Isehara; Akio Matsuyama, Kamakura, all of Japan

[73] Assignee: Mitsui Toatsu Chemicals, Incorporated, Tokyo, Japan

[21] Appl. No.: 748,480

[22] Filed: Jun. 25, 1985

[30] Foreign Application Priority Data

Jul. 2, 1984 [JP] Japan ................................ 59-135336

[51] Int. Cl.$^4$ ............................................. C08F 283/04
[52] U.S. Cl. .................................... 525/454; 526/270; 522/96
[58] Field of Search ...................... 525/454; 526/270; 522/96

[56] References Cited

U.S. PATENT DOCUMENTS

| | | | |
|---|---|---|---|
| 2,454,756 | 11/1948 | Rehberg et al. | 526/270 |
| 3,265,768 | 8/1966 | Mottus et al. | 526/270 |
| 3,600,290 | 8/1971 | Fitko | 525/502 |
| 4,284,731 | 8/1981 | Moser et al. | 525/454 |
| 4,446,286 | 5/1984 | Kolycheck et al. | 525/454 |
| 4,514,037 | 4/1985 | Bishop et al. | 525/454 |
| 4,525,258 | 6/1985 | Watunabe et al. | 522/40 |

FOREIGN PATENT DOCUMENTS 58-213767 12/1983 Japan .
1407813 9/1975 United Kingdom .

Primary Examiner—Joseph L. Schofer
Assistant Examiner—Bernard Lipman
Attorney, Agent, or Firm—Fisher, Christen & Sabol

[57] ABSTRACT

Disclosed herein is a coating composition which contains a urethane-modified (meth)acrylate compound and a mono(meth)acrylate and is curable upon its exposure to radiation. Also disclosed herein is a coating, especially, a primary coating for an optical fiber, which coating or cladding is composes of a cured material obtained by curing the composition through its exposure to radiation.

3 Claims, No Drawings

RADIATION-CURABLE COATING COMPOSITION

BACKGROUND OF THE INVENTION (a) Field of the Invention

This invention relates to a radiation-curable coating composition, which undergoes curing upon exposure to radiation to provide a rubber-like cured material having excellent electrical characteristics and superb elongation and elasticity and capable of absorbing vibrations and impacts, and also to a coating composed of the cured material.

(b) Description of the Prior Art

A variety of silicone resins have heretofore been used as insulating materials for electrical devices, apparatus and equipment and the like and as coating, covering or cladding materials for absorbing vibrations and impacts. A silicone resin has a low viscosity although its curable component or components amount nearly 100%. Its cured material is a rubber-like elastomer having excellent electrical characteristics and is also outstanding in heat resistance, freeze resistance, weatherability, adhesion properties and so on. These silicone resins are however accompanied by such drawbacks that they are not only expensive but also time-consuming for their curing. Their curing reactions are widely varied in types. One-pack type silicone resins release acetic acid, oximes and/or alcohols, whereby to induce corrosion on metals or to act as causes for the formation of pin holes in cured films. On the other hand, there are also some silicone resins which are curable by addition reactions. These silicone resins are however of the two-pack type and are thus inconvenient for applications.

On the other hand, there have also been known resins which are curable by radiation such as ultraviolet ray, electron beam, etc. Each of these resins generally contains its curable component or components to a total amount of almost 100%. They have low viscosities, are of the one-pack type, and feature high curing speeds. However, cured materials obtained from conventional radiation-curable resins are usually hard and lack elongation, and hence do not have properties as so-called rubber-like elastomers. Some butadiene-acrylate base resins have properties as rubber-like elastomers, but their cured materials have poor weatherability and even when left over in the air, lose their rubber-like elasticity little by little and eventually result in hard materials. Furthermore, such conventional radiation-curable resins are accompanied by another drawback that they undergo significant shrinkage upon their curing and when used as coatings or coverings, they exhibit poor adhesion properties. For these reasons, it was not possible to use conventional radiation-curable resins in place of such coating or covering silicone resins as described above.

Reflecting the sharp increase in the production of glass-base optical fibers in recent years, there is a strong demand, especially, for an excellent cladding material which can assure good productivity not attainable by any conventional silicone resins. Namely, a jacketed fiber useful for the production of a glass-base optical fiber is produced by covering a bare glass fiber of about 100 μm in diameter with a primary cladding of about 150 μm thick and then with a secondary cladding of about 250 μm thick. It is essential for the primary cladding to have excellent tensile elongation and also rubber-like elasticity, namely, to have a low Young's modulus in tension and to retain such properties at low temperatures. However, conventional coatings cured by radiation were not able to fully satisfy these requirements.

SUMMARY OF THE INVENTION

An object of this invention is to provide a radiation-curable composition which is of the one-pack type and has a low viscosity.

Another object of this invention is to provide a composition curable in a short period of time by its exposure to radiation to provide a cured material which has excellent elongation and rubber-like elasticity, namely, a low Young's modulus and is hence suitable for use as a coating, covering or cladding.

A further object of this invention is to provide a coating, covering or cladding composed of a cured material which has excellent elongation and rubber-like elasticity, namely, a low Young's modulus even at low temperatures.

A still further object of this invention is to provide a coating useful suitably as a primary coating for an optical fiber.

In one aspect of this invention, there is thus provided a radiation-curable coating composition, which comprises:

(A) a urethane-modified (meth)acrylate compound; and (B) a mono(meth)acrylate of the following general formula (I):

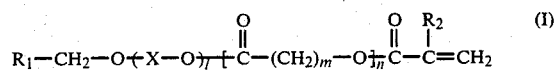

wherein $R_1$ means

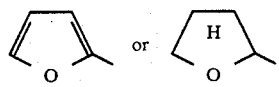

$R_2$ denotes a hydrogen atom or methyl group, X is $-CH_2-CH_2-$ or

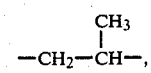

l stands for an integer of 0–6, m means an integer of 3–5, n is an integer of 0–6, and l+n is 1–8.

In another aspect of this invention, there is also provided a coating composed of a cured material obtained by curing the above composition through its exposure to radiation.

The composition of this invention is of the one-pack type, has a low viscosity and is readily curable upon its exposure to radiation. The resultant cured material shows excellent elongation and rubber-elasticity, even at low temperatures. It can thus be used suitably as a primary coating for an optical fiber upon fabrication of a jacketed glass fiber.

The above and other objects, features and advantages of the present invention will become apparent from the following description.

DETAILED DESCRIPTION OF THE INVENTION

The term "(meth)acrylate" as used herein means both acrylate and methacrylate. Besides, the terms "(meth)acryloyl group", "(meth)acrylic acid", "hydroxyethyl (meth)acrylate", "hydroxypropyl (meth)acrylate" and the like should also be interpreted in the same sense.

The urethane-modified (meth)acrylate (A) useful in the practice of this invention is a compound which can be obtained by reacting three compounds, namely, (a) a polyisocyanate compound, (b) a polyhydroxy compound and (c) an unsaturated monohydroxy compound containing one hydroxyl group and one or more (meth)acryloyl groups per molecule. The polyisocyanate compound (a) is a material containing 2 or more isocyanate groups per molecule. As specific examples of the polyisocyanate compound (a), may be mentioned diisocyanate compounds such as 2,4-tolylenediisocyanate, 2,6-tolylenediisocyanate, diphenylmethane-4,4'-diisocyanate, xylylenediisocyanate, naphthylenediisocyanate, lysidinediisocyanate, hexamethylenediisocyanate, isophoronediisocyanate and dicyclohexylmethanediisocyanate, dimers and trimers of these diisocyanate compounds, and compounds obtained by reacting, under conditions of excess isocyanate groups, the above diisocyanate compounds with polyols such as ethylene glycol, propylene glycol, neopentyl glycol, hexanediol, trimethylolpropane, glycerin and hexanetriol. These polyisocyanate compounds may be used either singly or in combination.

The above-described polyhydroxy compound (b) is a compound containing two or more hydroxyl groups per molecule, with those having molecular weights of 700 and higher being preferred. Illustrative of the polyhydroxy compound (b) may include polyether polyols such as polyethylene glycol, polypropylene glycol, polypropylene triol and polyoxytetramethylene glycol, polyester polyols obtained by reacting adipic acid and dodecanedicarboxylic acid with the above-described polyols, diethylene glycol, tripropylene glycol, polypropylene glycol and the like, and polycaprolactone polyol, saturated polyolefins containing terminal hydroxyl groups, etc. These polyhydroxy compounds may be used either singly or in combination. If a polyhydroxy compound having a molecular weight not greater than 700 is used in the present invention, the resulting cured material will be too hard. It is thus not preferred to use such a polyhydroxy compound.

As the above-described unsaturated monohydroxy compound (c), may be mentioned, for example, 2-hydroxyethyl (meth)acrylate, 2-hydroxypropyl (meth)acrylate, N-hydroxymethyl (meth)acrylate, diethyleneglycol mono(meth)acrylate, trimethylolpropane di(meth)acrylate, glycerin di(meth)acrylate, polyethyleneglycol mono(meth)acrylate, polypropyleneglycol mono(meth)acrylate, the equimolar reaction product of glycidyl (meth)acrylate and (meth)acrylic acid, and so on. They may be employed either singly or in combination.

The urethane-modified (meth)acrylate useful in the practice of this invention is, as mentioned above, a compound obtained by reacting the three compounds (a), (b) and (c). Usually, these compounds are reacted in amounts of 1.1–2.0 equivalents, or preferably 1.2–1.8 equivalents of the compound (a) and 0.1–1.2 equivalents, or preferably 0.2–1.0 equivalent of the compound (c), both per equivalent of the compound (b). There is no particular limitation imposed on the order in which the compounds (a), (b) and (c) are reacted. For example, the compounds (a), (b) and (c) may be reacted at once, the compound (c) may be reacted after the compounds (a) and (b) have been reacted, or alternatively, the compound (b) may be reacted after the compounds (a) and (c) have been reacted. The reaction temperature may generally range from room temperature to 150° C. Upon effecting this reaction, it may be possible to use a usual urethanization catalyst such as triethylamine, dibutyltin dilaurate or the like for the acceleration of the reaction, or to employ a usual radical reaction inhibitor such as benzoquinone, hydroquinone, hydroquinone monomethyl ether, catechol, phenothiazine or the like or to introduce air or oxygen into the reaction system for preventing polymerization of (meth)acryloyl groups.

The urethane-modified (meth)acrylate useful in the practice of this invention is terminated usually in (meth)acryloyloxy groups. Some of such terminal (meth)acryloyloxy groups may be replaced by isocyanate or hydroxyl groups.

Exemplary mono(meth)acrylates (B), which are represented by the general formula (I) and are useful in the practice of this invention, may include the (meth)acrylates of monohydroxy compounds each of which is obtained by adding one or more moles of ethylene oxide, propylene oxide, butyrolactone, valerolactone, caprolactone or the like to one mole of furfuryl alcohol or tetrahydrofurfuryl alcohol. As specific examples of such mono(meth)acrylates (B), may be mentioned ethylene glycol monofurfuryl ether (meth)acrylate, ethylene glycol monotetrahydrofurfuryl ether (meth)acrylate, propylene glycol monotetrahydrofurfuryl ether (meth)acrylate, diethylene glycol monofurfuryl ether (meth)acrylate, dipropylene glycol monotetrafurfuryl ether (meth)acrylate, tetraethylene glycol monotetrahydrofurfuryl ether (meth)acrylate, hexapropylene glycol monotetrahydrofurfuryl ether (meth)acrylate, the (meth)acrylate of addition product between furfuryl alcohol and γ-butyrolactone, the (meth)acrylate of addition product between tetrafurfuryl alcohol and 3 moles of γ-butyrolactone, the (meth)acrylate of addition product between tetrahydrofurfuryl alcohol and ε-caprolactone, the (meth)acrylate of addition product between furfuryl alcohol and 3 moles of ε-caprolactone, the (meth)acrylate of addition product between ethylene glycol monotetrahydrofurfuryl ether and ε-caprolactone, the (meth)acrylate of addition product between dipropylene glycol monotetrafurfuryl ether and ε-caprolactone, the (meth)acrylate of addition product between triethylene glycol monotetrahydrofurfuryl ether and 2 moles of ε-caprolactone, and the like. When l is 2 or greater in the general formula (I), Xs may be the same or different. When l and n are both 0 in the general formula (I), namely, the mono(meth)acrylate is furfuryl (meth)acrylate or tetrahydrofurfuryl (meth)acrylate, the mono(meth)-acrylate exhibits strong irritation against the skin and hence tends to develop inflammation, and the resulting cured material has poor rubber-like elasticity. From the viewpoint of this irritation to the skin and the poor elasticity of the resultant cured material, an integer of 1 or greater is preferred for l. It is more preferable when l is 1 or greater and n is also 1 or greater. On the other hand, it is not preferred if the resultant cured material becomes too soft conversely or stickiness remains on the surface of the resultant cured material. For these reasons, l may preferably be 6 or smaller, n may preferably 6 or smaller, more preferably, 4 or smaller, and l+n may preferably 8 or smaller. The mono(meth)acrylate useful in the practice of this invention may however take, depending on its production process, the form of a mixture of mono(meth)acrylates in which l and n stand for various integers. One or more mono(meth)acrylates, in each of which l and n exceed 6or l+n is greater than 8, may still be contained to such concentrations that they do not impair the advantageous effects of this invention. In the present invention, such mono(meth)acrylates may be used singly or two or more of such mono(meth)acrylates may be used by mixing them at desired proportions.

In the present invention, the respective components may generally be used at the following proportions: (A) the urethane-modified (meth)acrylate 20-60 wt. % and (B) the mono(meth)acrylate, 80-40 wt. %. If the urethane-modified (meth)acrylate should be less than 20 wt. % or the mono(meth)acrylate should exceed 80%, the curing speed will be lowered and the resulting cured material have poor rubber-like elasticity. If the urethane-modified (meth)acrylate should exceeds 60 wt. % or the mono(meth)acrylate should be less than 40% on the other hand, the viscosity of the resulting coating composition will become too high and some problems will arise from the viewpoint of workability or working efficiency. In addition, the resulting cured material will be poor in flexibility.

The coating composition of this invention can be easily cured by exposing it to radiation. As radiation useful for this purpose, may be mentioned, for example, electron beam, beta ray, gamma ray, and ultraviolet ray. A sensitizer may be added to the coating composition of this invention if necessary upon its curing, especially, when curing it by ultraviolet ray. As exemplary sensitizers, may be mentioned benzoin, benzoin methyl ether, benzoin ethyl ether, benzoin isopropyl ether, benzoin butyl ether, benzil, diacetyl, benzophenone, 2-hydroxy-2-methylpropiophenone, 2,2-diethoxyacetophenone, benzyl dimethyl ketal, anthraquinone, chloroanthraquinone, ethylanthraquinone, butylanthraquinone, diphenyl sulfide, dithiocarbamate, 2-chlorothioxanthone, α-chlomethylnaphthalene, anthracene, 3,3',4,4'-tetra-(t-butylperoxycarbonyl)-benzophenone, etc. It is also possible to use an amine such as Michler's ketone, triethylamine, alkylmorpholine or the like in combination with one or more of such photosensitizers. In general, the proportion of such a sensitizer may preferably be less than 10 wt. % of the corresponding coating composition of this invention. Even if such a sensitizer should be used in any amounts of 10% and higher, no particular additional merits will be brought about from the viewpoint of its function but an economical disadvantage will certainly be brought about.

When preparing the coating composition of this invention, it may also be possible to incorporate to such extents not adversely affecting the advantageous effects of the present invention, for example, one or more mono(meth)acrylates such as 2-ethylhexyl (meth)acrylate, dodecyl (meth)acrylate, phenoxyethyl (meth)acrylate, cyclohexyl (meth)acrylate, ethylene glycol nonylphenyl ether (meth)acrylate, tripropylene glycol nonylphenyl ether (meth)acrylate, the (meth)acrylic acid addition product of butyl glycidyl ether, the (meth)acrylic acid addition product of phenyl glycidyl ether, hydroxyethyl (meth)acrylate and/or hydroxypropyl (meth)acrylate, and/or poly(meth)acrylates such as ethylene glycol di(meth)acrylate, neopentyl glycol di(meth)acrylate, 1,4-butanediol di(meth)acrylate, trimethylolpropane tri(meth)acrylate, dipentole hexa(meth)acrylate, the di(meth)acrylate of addition product between bisphenol A and ethylene oxide, the (meth)acrylic acid addition product of bisphenol A diglycidyl ether, polyester (meth)acrylates and/or melamine (meth)acrylates. It is also possible to incorporate, in suitable amounts, one of more of various additives such as usual solvent, plasticizer, leveling agent, thixotropic agent, anti-cissing agent, anti-blocking agent, slipping agent, coupling agent, thickener, polymerization inhibitor, antioxidant and/or the like; one or more fillers such as talc, calcium carbonate, alumina, silica, mica, barium sulfate, magnesium carbonate, glass powder and/or various polymer powder; one or more pigments and/or dyes such as titanium oxide, zinc white, carbon black, red iron oxide, Phthalocyanine Blue and/or Phthalocyanine Green; and/or one or more resins such as polyester resins, acrylic resins, polyvinyl chloride, polyvinyl butyral, epoxy resins, urethane resins, polyethylene and/or waxes.

The coating composition of this invention is coated to a suitable thickness on the surface of such a base material as exemplified below and is then exposed to radiation to cure it into a cured film. In this manner, the cured film can be used suitably as an organic coating for the base material. Examples of the base material may include: metals such as iron, aluminum and copper; inorganic materials such as glass, cement, gypsum and mortar; and organic materials such as vinyl chloride resin, acrylic resins, polycarbonate resins, polyolefin resins, polystyrene resins, urethane resins, melamine resins, phenol resins, epoxy resins, unsaturated polyester resins and wood. The cured film composed of the cured material shows good elongation and have rubber-like elasticity, and retains rubber-like elasticity, i.e., a low Young's modulus even at low temperatures. Thus, it can be suitably used especially as a primary cladding for a glass-base optical fiber. Incidentally, as coating methods, it is possible to apply methods known per se in the art, such as spray coating, roll coater, dipping, etc.

Certain suitable embodiments of this invention will hereinafter be described in further detail by the following Syntheses and Examples.

Synthesis 1

Charged in a 500 ml flask equipped with stirrer and thermometer were 300 parts of polyoxytetramethylene glycol having a molecular weight of 2,000 and 42 parts of hexamethylene diisocyanate. When they were reacted under a nitrogen gas stream, at 70° C. and for 5 hours, NCO groups decreased to 2/5 times those existed at the beginning. Then, 27 parts of hydroxypropyl acrylate, 0.25 part of hydroquinone and 0.1 part of dibutyltin laurate were added to the liquid reaction mixture. The contents were reacted at 70° C. for further 5 hours while bubbling air in the liquid reaction mixture, thereby synthesizing a urethane-modified (meth)acrylate (A-1).

Synthesis 2

Charged in a 500 ml flask equipped with stirrer and thermometer were 200 parts of polycaprolactone glycol having a molecular weight of 1,000 and 70 parts of 2,4-tolylenediisocyanate. When they were reacted under a nitrogen gas stream, at 70° C. and for 5 hours in the same manner as in Synthesis 1, NCO groups decreased to ½ times those existed at the beginning. Then, 47 parts of hydroxyethyl acrylate, 0.3 part of hydroquinone and 0.15 part of dibutyltin laurate were added to the liquid reaction mixture. The contents were reacted at 70° C. for further 6 hours while bubbling air in the liquid reaction mixture, thereby synthesizing a urethane-modified (meth)acrylate (A-2).

Synthesis 3

To 146 parts of ethylene glycol monotetrahydrofurfuryl ether, 114 parts of $\epsilon$-caprolactone and 0.02 part of tetrabutyl titanate were added. The contents were then reacted at 160°–170° C. for 2 hours, with stirring under a nitrogen gas stream, thereby forming an $\epsilon$-caprolactone addition product of ethylene glycol monotetrahydrofurfuryl ether. The OH value of this addition product was 215 KOH mg/g.

Then, 76 parts of acrylic acid, 350 parts of toluene, 0.15 part of hydroquinone and 5 parts of p-toluenesulfonic acid were added to 260 parts of the above-formed addition product. An esterification was conducted at 95°–100° C. with air bubbling, while distilling off the resulting water as an azeotropic mixture with toluene to the outside of the reaction system. The liquid reaction mixture was then washed with water to remove the p-toluenesulfonic acid. Thereafter, the toluene was removed to obtain the acrylate of the $\epsilon$-caprolactone addition product of ethylene glycol monotetrahydrofurfuryl ether (B-1).

Synthesis 4

By using 276 parts of a mixture of monools, which had been obtained by adding on average 3 moles of propylene oxide to 1 mole of tetrahydrofurfuryl alcohol, 114 parts of $\epsilon$-caprolactone and 0.03 part of tetrabutyl titanate, the $\epsilon$-caprolactone addition products of monools were prepared in the same manner as in Synthesis 3. The OH value of this addition product was 144 KOH mg/g.

Then, 76 parts of acrylic acid, 460 parts of toluene, 0.22 part of hydroquinone and 10 parts of p-toluenesulfonic acid were added to 390 parts of the above-prepared addition product, followed by esterification, water-washing and toluene removal in the same manner as in Synthesis 3 to synthesize a mono(meth)acrylate (B-2).

Synthesis 5

By using 146 parts of ethylene glycol monotetrahydrofurfuryl ether, 342 parts of $\epsilon$-caprolactone and 0.04 part of tetrabutyl titanate, an addition product between 1 mole of ethylene glycol monotetrahydrofurfuryl ether and 3 moles of $\epsilon$-caprolactone was prepared in the same manner as in Synthesis 3. The OH value of this addition product was 115 KOH mg/g.

Then, 76 parts of acrylic acid, 560 parts of toluene, 0.27 part of hydroquinone and 12 parts of p-toluenesulfonic acid were added to 488 parts of the above-prepared addition product, followed by esterification, water-washing and toluene removal in the same manner as in Synthesis 3 to synthesize a mono(meth)acrylate (B-3).

EXAMPLE 1

A coating composition was prepared by mixing 40 parts of the urethane-modified (meth)acrylate (A-1) prepared in Synthesis 1, 60 parts of the mono(meth)acrylate (B-1) prepared in Synthesis 3 and 4 parts of benzoin ethyl ether. The viscosity of the thus-prepared composition was 1,800 cps.

Thereafter, the coating composition was applied to a thickness of about 150 $\mu$m on a glass plate. By using a high-pressure mercury lamp, the thus-applied coating composition was exposed to an ultraviolet ray of 500 millijoules/cm$^2$ in a nitrogen gas atmosphere to cure the coating composition. A cured film composed of the thus-cured resin was peeled off from the glass plate. Following JIS K-6301, its tensile strength and elongation Young's modulus in tension were measured and by using a Shore durometer, its hardness was also determined. Results are shown in Table 1.

On the side, the above coating composition was also applied onto an aluminum plate of 0.5 mm thick to give a film thickness of about 100 $\mu$m. After exposing it to an ultraviolet ray under the same conditions as those mentioned above to cure the same, the aluminum plate was bent with the coating facing outside but no changes were observed on the coating.

EXAMPLES 2–5

Coating compositions shown in Table 1 were respectively prepared. They were cured in the same manner as in Example 1, thereby forming cured films. These films were then evaluated. Results are also summarized in Table 1.

EXAMPLE 6

A coating composition was prepared by mixing 40 parts of the urethane-modified (meth)acrylate (A-1) prepared in Synthesis 1 and 60 parts of the mono(meth)acrylate (B-1) prepared in Synthesis 3. The viscosity of this composition was 2,000 cps.

Then, this coating composition was applied onto a glass plate to a thickness of about 150 $\mu$m. By exposing the thus-coated composition to an electron beam of 5 Mrad in a nitrogen gas atmosphere, it was cured into a cured film. Physical properties of the cured film were measured. Its tensile strength was 13.2 kg/cm$^2$, elongation 125%, hardness (Shore D) 40, and Young's modulus in tension 12.8 kg/cm$^2$ at 23° C. and 39 kg/cm$^2$ at $-40°$ C.

COMPARATIVE EXAMPLES 1 & 2

Experiments were conducted on the formulations in the same manner as in Example 1 except that tetrahydrofurfuryl acrylate [in the general formula (I), l=0, n=0] was employed as the mono(meth)acrylate component. Experiment results are shown in Table 1.

As apparent form Table 1, the cured materials of this invention had excellent elongations and superb rubber-like elasticity, namely, low Young's moduli in tension at room temperature. Although the cured materials obtained in the Comparative Examples had extremely high Young's moduli in tension at $-40°$ C. and lost rubber-like elasticity, the cured materials of this invention retained low Young's moduli in tension, namely, rubber-like elasticity at $-40°$ C. It was therefore demonstrated that the cured materials of this invention were suitably usable as coatings, coverings or claddings, especially, as primary coatings for glass-base optical fibers.

TABLE 1

|  |  | Ex. 1 | Ex. 2 | Ex. 3 | Ex. 4 | Ex. 5 | Comp. Ex. 1 | Comp. Ex. 2 |
|---|---|---|---|---|---|---|---|---|
| Formulation of coating composition | Urethane-modified (meth)acrylate (A) (parts) | A-1 (40) | A-1 (40) | A-1 (40) | A-2 (60) | A-2 (60) | A-1 (40) | A-2 (60) |
|  | Mono(meth)- acrylate (B) (parts) | B-1 (60) | B-2 (60) | B-3 (60) | B-1 (40) | B-2 (40) | C (60) | C (40) |
|  | Sensitizer (parts) | a (4) | a (4) | a (4) | b (4) | b (4) | a (4) | a (4) |
| Viscosity of composition (CPS) (25° C.) |  | 1,800 | 2,400 | 2,900 | 4,700 | 5,500 | 1,200 | 4,100 |
| Properties of cured material (cured film) (23° C.) | Tensile strength (kg/cm$^2$) | 11.0 | 13.0 | 14.0 | 18.0 | 20.0 | 53.0 | 48.0 |
|  | Elongation (%) | 120 | 180 | 170 | 220 | 240 | 55 | 60 |
|  | Hardness (Shore D) | 40 | 25 | 30 | 35 | 35 | over 100 | over 100 |
|  | Bending test | no change | no change | no change | no change | no change | cracks developed | cracks developed |
| Young's modulus in tension | 23° C. (Kg/cm$^2$) | 12.5 | 13.1 | 14.2 | 20.5 | 22.3 | 41 | 49 |
|  | −40° C. (Kg/cm$^2$) | 37 | 42 | 48 | — | — | over 1,000 | over 1,000 | a: Benzoin ethyl ether;
b: Benzyl dimethyl ketal;
C: Tetrahydrofurfuryl acrylate

What is claimed is:

1. Radiation-curable coating composition, which comprises:

(A) a urethane-modified (meth)acrylate compound which has been prepared by reacting (a) a polyisocyanate compound containing two or more isocyanate groups per molecule, (b) a polyhydroxy compound containing two or more hydroxyl groups per molecule and (c) an unsaturated monohydroxy compound in amounts of 1.1 to 2.0 equivalents of the compound (a) and 0.1 to 1.2 equivalents of the compound (c), both per equivalent of the compound (b); and (B) a mono(meth)acrylate of the following general formula (I):

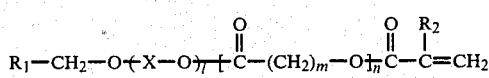

wherein R$_1$ means

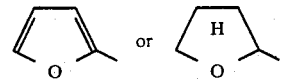

R$_2$ denotes a hydrogen atom or methyl group, X is —CH$_2$—CH$_2$— or

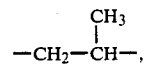

l stands for an integer of 1 to 6, m means an integer of 3 to 5, n is an integer of 1 to 6, and l=n is 2 to 8, the amounts of the compounds (A) and (B) being 20 to 60 weight percent and 80 to 40 weight percent, respectively.

2. The radiation curable coating composition as claimed in claim 1 wherein polyoxy compound (b) has a molecular weight of 700 or higher.

3. The radiation curable coating composition as claimed in claim 1 wherein the amounts of the compounds (a) and (c) are, respectively, 1.2 to 1.8 and 0.2 to 1.0 equivalent per equivalent of the compound (b).

* * * * *